(No Model.)　　　　　　　G. FALCONNIER.　　　　5 Sheets—Sheet 1.
GLASS BUILDING BLOCK.
No. 402,073.　　　　　　　　　　　Patented Apr. 23, 1889.
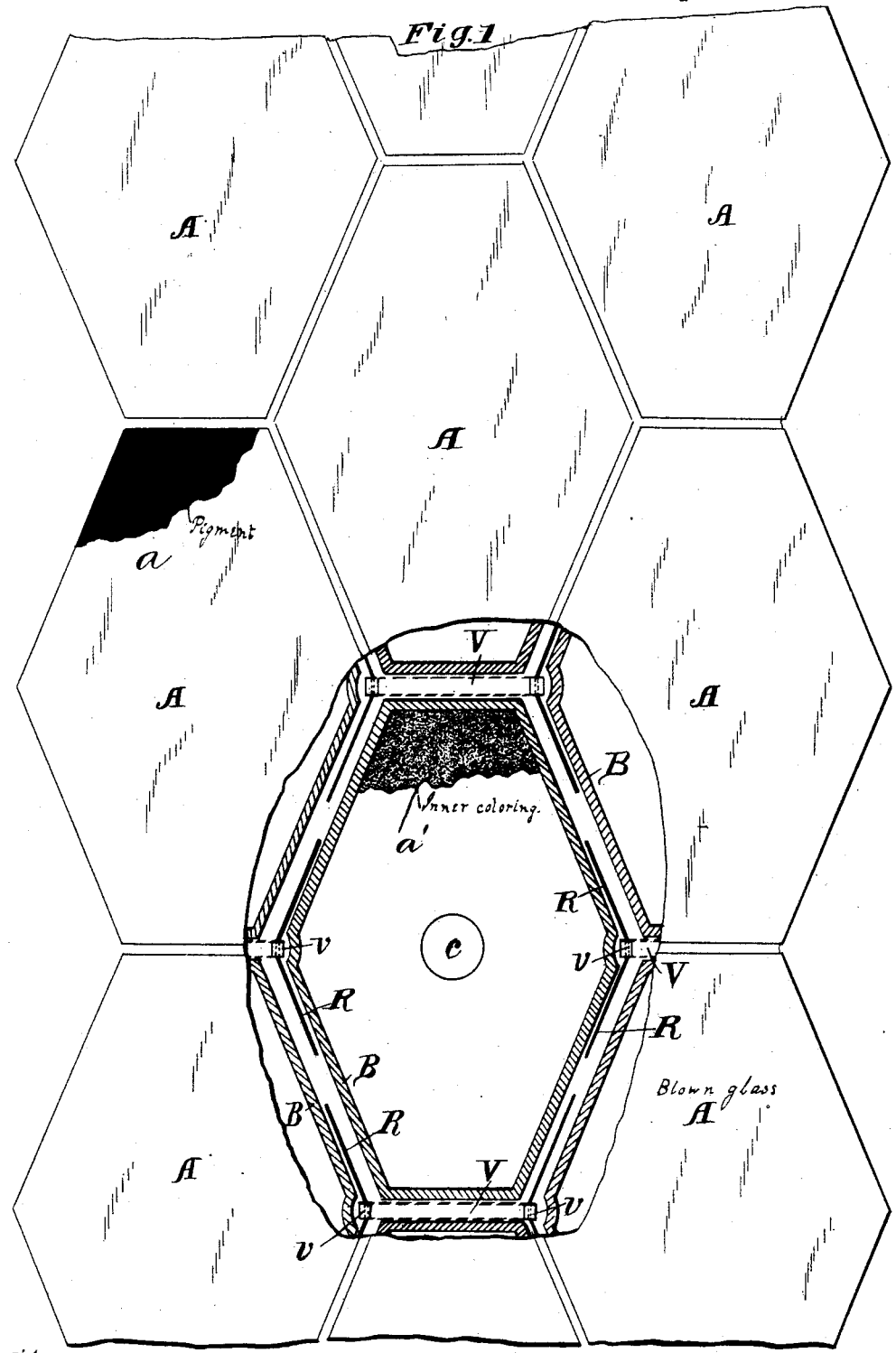
Witnesses:　　　　　　　　　　　　　　　　Inventor:

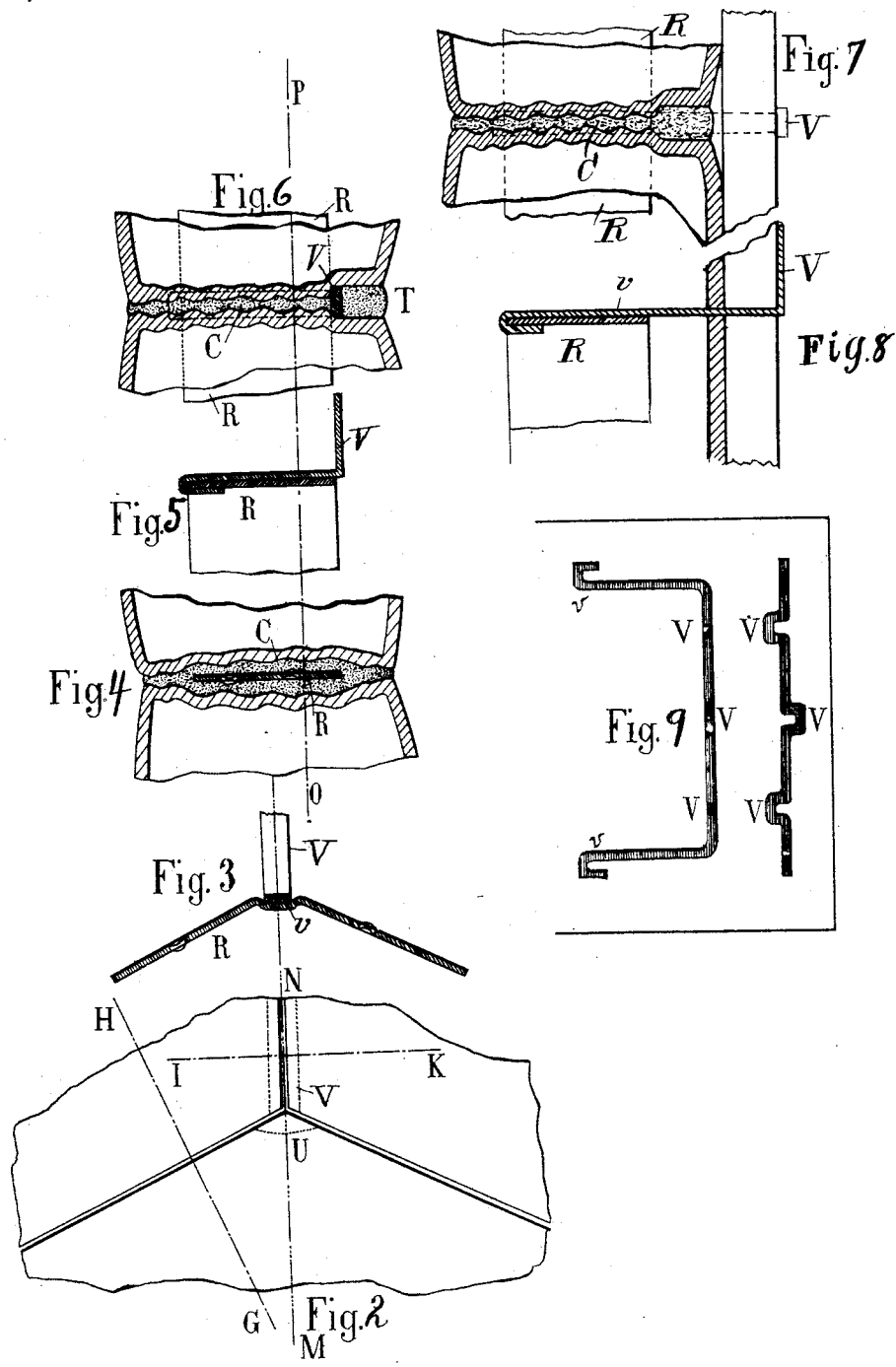

(No Model.) 5 Sheets—Sheet 3.
G. FALCONNIER.
GLASS BUILDING BLOCK.
No. 402,073. Patented Apr. 23, 1889.
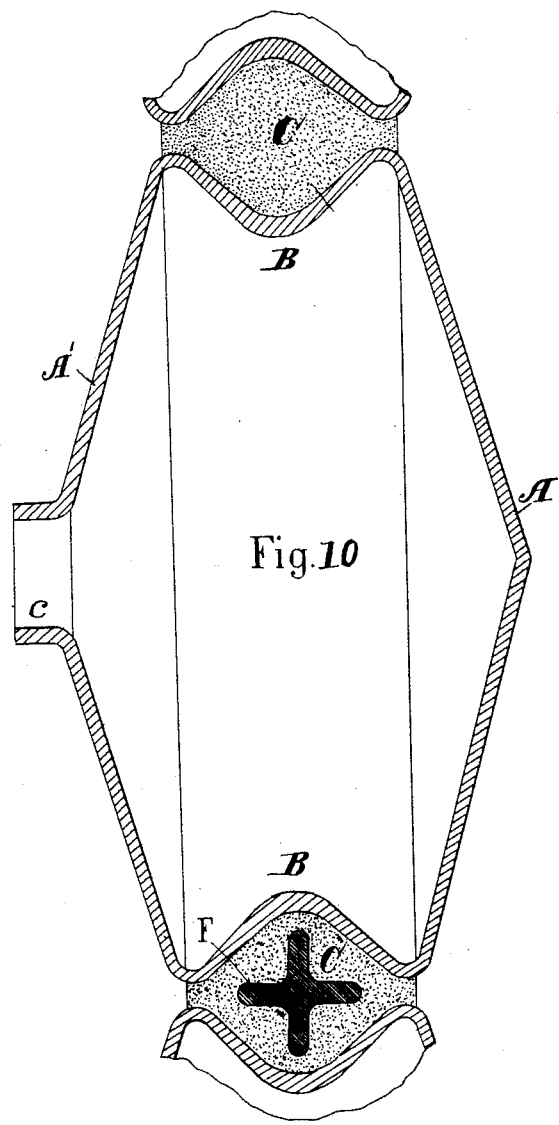

(No Model.) 5 Sheets—Sheet 4.
G. FALCONNIER.
GLASS BUILDING BLOCK.
No. 402,073. Patented Apr. 23, 1889.
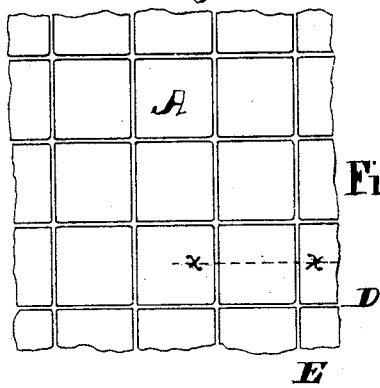
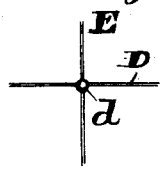
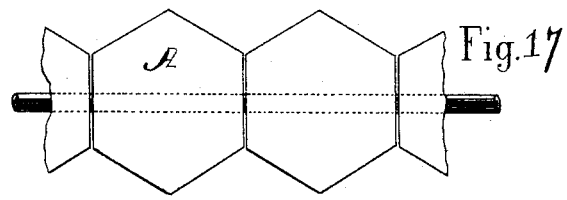
Witnesses:
J. C. Turner
B. M. Sommers
Inventor:
Gustave Falconnier
Doubleday & Bliss
attys.

(No Model.) 5 Sheets—Sheet 5.
G. FALCONNIER.
GLASS BUILDING BLOCK.
No. 402,073. Patented Apr. 23, 1889.
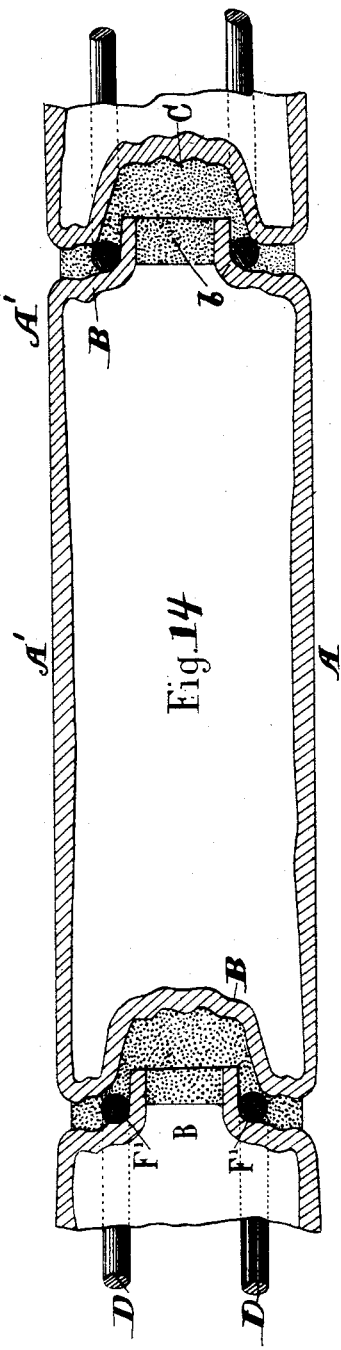
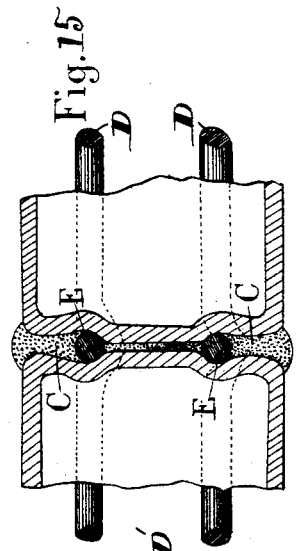
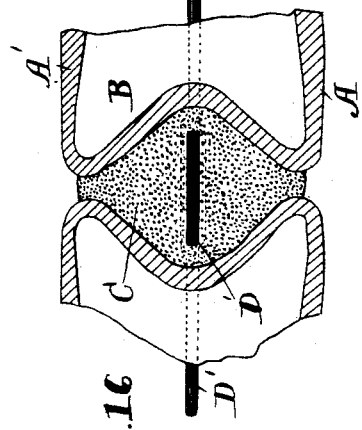

UNITED STATES PATENT OFFICE.

GUSTAVE FALCONNIER, OF NYON, VAUD, SWITZERLAND.

GLASS BUILDING-BLOCK.

SPECIFICATION forming part of Letters Patent No. 402,073, dated April 23, 1889.

Application filed June 25, 1887. Serial No. 242,532. (No model.) Patented in France November 11, 1886, No. 179,595; in Germany March 14, 1887, No. 41,773; in Belgium April 15, 1887, No. 77,079, and in England April 19, 1887, No. 5,723.

*To all whom it may concern:*

Be it known that I, GUSTAVE FALCONNIER, a citizen of Switzerland, residing at Nyon, Vaud, have invented certain new and useful Improvements in Glass Building Material and the Method of Using the Same, (the same having been patented in foreign countries, as follows, to wit: in France November 11, 1886, No. 179,595; in Germany March 14, 1887, No. 41,773; in Belgium April 15, 1887, No. 77,079; in England April 19, 1887, No. 5,723;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a top view of a number of bricks embodying my invention. Fig. 2 is a reverse or bottom view of parts of three bricks. Fig. 3 is a section of the metallic clamping devices, taken on line O P, Fig. 5, looking toward the right of Fig. 5. Fig. 4 is a section on G H, Fig. 2. Fig. 5 is a section of Fig. 3 on line M N. Fig. 6 is a section on line I K, Fig. 2. Figs. 7 and 8 show modifications. Fig. 9 is a detached view in two positions of the clamp shown in Figs. 1 to 6. Fig. 10 is a central vertical section of parts of three bricks under a modification. Fig. 11 shows a plan view of a modification on a reduced scale. Figs. 12 and 13 are detached views of Fig. 11, Fig. 13 being taken on line *x x*, Fig. 11. Figs. 14, 15, and 16 illustrate other modifications. Fig. 17 shows another modification.

It is well known that under the improved modes of making glass its production has been greatly cheapened and its toughness improved, whereby it has become better adapted for use in the construction of the ornamental parts of buildings, particularly for window-sills, the covering of façades, and in the construction of the walls of various structures—such as hot-houses, vaults, trellises, and in bath-rooms—for roofs, and for any other purposes where it is adapted to take the place of any of the vitreous, earthenware, or other compositions of material which it is adapted to supersede. I propose to cast or blow these bricks in any convenient or ornamental shape which may be desired, and to color them either in the mass or by coating or covering them inside or outside in full or in part with layers of metal or paint; or I propose to change their appearance by filling or partially filling them with some material after they have been formed into shape. I also propose to produce upon their surfaces ornamental or other designs by the use of sand-blast or other cutting or engraving processes, or by the employment of acids or any of the well-known means commonly employed among glass-workers. By making such bricks or blocks hollow, especially when they are made air-tight, they possess several advantages over other materials, being cheap, light, durable, and ornamental. Further, by reason of their inclosing and confining air in a state of rest they serve as non-conductors of heat.

Referring to the drawings, A is the outer face, A' the inner face, and B the edge of one of these bricks. The outer or inner face, or both, may be either flat or convex, as preferred, and the opening *c* may be closed by any of the well-known processes. When desired, the inner face or the outer face may have applied thereto some coloring material, as above indicated, and which is illustrated at *a* as being a pigment and at *a'* as being some colored material adapted to be introduced through the opening *c*, and which will change the appearance of the brick, because of the walls of the latter being transparent or semi-transparent.

The edges of the bricks are curved, recessed, or ribbed and grooved, as indicated, to receive a suitable cement, C, of plastic material of such character that after it has hardened it will constitute a suitable frame or setting to keep adjacent bricks in position relatively to each other. In order, however, to insure their remaining in proper position, I propose to strengthen or re-enforce this setting by the use of metallic strips, rods, bars, or other fasteners, several forms of which I have shown in the drawings. For instance, in Figs. 1 to 9, inclusive, R indicates flat or corrugated strips of metal pierced with holes to receive the cement.

At the points of intersection or joining of the corners of the bricks I secure the flat strips to each other by means of clamps V *v v*, of which the arms or bent ends *v v* are formed into hooks to take hold of the upper edges of the flat strips R upon opposite sides of the bricks which lie between these arms, the horizontal part V lying, preferably, in a groove or recess, T, formed in the adjacent edges of two of the bricks, part of the recess being in one brick and part in the other, as is plainly indicated in Figs. 2, 3, 5, 6, and 7. When desired, the recess may be filled with cement after the other parts are placed in position.

When it is desired to secure the bricks to a wall or other support, the arms *v v* may be made long enough to reach through or into such support, as is indicated in Figs. 7 and 8, and under such circumstances I propose to interpose a suitable packing, filling, or cushion of elastic or semi-elastic substance between the bricks and their support to guard against fracture of the glass whenever such support is of metal or stone.

In Fig. 10 I have shown a modification, in which there is a strengthening-strip between the edges of the brick and bedded in the cement, said support being in the form of a cross in cross-section.

In Figs. 11, 12, and 13 I have shown bricks with right angles, in combination with rods D E, arranged between them in the cement. These rods may be interlaced or interwoven with each other, or they may be tied or otherwise secured to each other at their points of intersection, as indicated in Fig. 12, or both modes of securing the two sets of wires to each other may be employed.

In Figs. 14 and 15 two sets of rods are used, one set being arranged quite close to either face of the brick.

In Fig. 16 the supporting-ribs D' are flat, and may at their crossings be suitably tied or riveted to each other.

In Fig. 17 the bricks are perforated on lines to receive rods which intersect their edges, so that the bricks are practically strung upon these rods.

I am aware that bricks have been made in the form of short tube-sections of different diameters or sizes in cross-section, so that when laid up in a wall with their ends abutting the smaller ones could be arranged inside of the larger ones and break joints therewith, and that the larger of such tube-sections were angular in cross-section with grooves in their adjacent faces to receive a locking or binding cement, such bricks having been made of clay or other analogous material, such as is ordinarily used for brick, tile, and similar things; but I believe I am the first to make a brick or building-block of glass or other vitreous material which is capable of being blown into the form of a hollow body having practically continuous and unbroken sides, and which therefore possesses many advantages which are not incident to bricks or building-blocks formed of other material, nor of any material when in the form of tube-sections.

Although there are features of advantage incident to the articles herein set forth irrespective of the process by which they are formed, yet there are specific advantages arising from the particular process I herein refer to—namely, that of "blowing" the glass into the form required. The brick when so made can be comparatively thin in each wall, and yet thick enough to be sufficiently strong. Again, the interior chamber can be readily formed, whereas it would be difficult, if not impossible, to impart to the bricks the features herein set forth if they were produced by pressing or molding.

By examining Figs. 4, 6, and 10 it will be seen that the face walls or larger inner and outer sides of the brick diverge from the edges, the several parts of each wall, as shown, converging toward its center, so that each side in section approximates a conical shape. As illustrated in Fig. 10, the blow-hole is at the apex of one of these side walls, which, if desired, can be closed in any suitable way, but which, even if left open, does not materially change the fact that the brick contains a chamber which is substantially entirely inclosed. Even in the latter case the edge walls and the side or face walls are all integral as a result of producing them by blowing. In Fig. 14 the blow-hole is at one of the edges, and in this case the cement, *b*, can be utilized to effect the closing of it. The interior chamber is of greater cross-dimension than the blow-aperture, the latter being as small as possible.

I am aware of the fact that pressed or molded solid glass blocks have been proposed for building purposes.

What I claim is—

1. As a new article of manufacture, a blown-glass building-block having an air-chamber substantially entirely closed by the walls thereof, substantially as set forth.

2. As a new article of manufacture, a blown-glass building-block having an air-chamber substantially entirely closed by the walls thereof and provided with a coloring material within the inclosed air-chamber, substantially as set forth.

In testimony whereof I affix my signature in presence of two witnesses.

GUSTE. FALCONNIER.

Witnesses:
 LYELL T. ADAMS,
 E. PERRODY.